(12) United States Patent
Liu

(10) Patent No.: US 6,243,079 B1
(45) Date of Patent: Jun. 5, 2001

(54) INITIALIZATION METHOD FOR ONE-WAY COMMUNICATIONS AND APPARATUS FOR USE THEREWITH

(75) Inventor: Shu-Ming Liu, Taipei Hsien (TW)

(73) Assignee: Primax Electronics, Ltd., Taipei Hsien (TW)

( * ) Notice: Subject to any disclaimer, the term of this patent is extended or adjusted under 35 U.S.C. 154(b) by 0 days.

(21) Appl. No.: 09/110,651

(22) Filed: Jul. 7, 1998

(51) Int. Cl.⁷ .................................................. G09G 5/00
(52) U.S. Cl. .......................... 345/168; 345/169; 345/158
(58) Field of Search ..................... 345/158, 169, 345/168, 156, 172, 173; 710/64; 341/21, 22, 26

(56) References Cited

U.S. PATENT DOCUMENTS 5,861,822 * 1/1999 Park et al. ............................. 345/168
5,999,996 * 12/1999 Dunn ....................................... 710/64
6,052,116 * 4/2000 Takagi .................................... 345/169

* cited by examiner

Primary Examiner—Bipin Shalwala
Assistant Examiner—David L. Lewis
(74) Attorney, Agent, or Firm—Bacon & Thomas, PLLC

(57) ABSTRACT

A method of simulating two-way communications over a one-way communications system, enabling an indicator on the transmitter to reflect the manner in which signals from a function key on the transmitter side will be interpreted by an application on the receiver side of the communications system, is carried out by causing a list of current states of the function on the receiver side of the communications system rather than transmitting a signal concerning the current state of the list to the transmitter side. The transmitter side of the communication system is part of a wireless keyboard that does not include a receiver to properly indicate which of two possible states a function of the computer will be in even though the computer has no way of communicating that state to the receiver.

15 Claims, 3 Drawing Sheets

INITIALIZATION METHOD FOR ONE-WAY COMMUNICATIONS AND APPARATUS FOR USE THEREWITH

BACKGROUND OF THE INVENTION

1. Field of the Invention

This invention relates to the field of unidirectional wireless communications, and in particular to a method of causing a status indicator on the transmitter side of a unidirectional wireless communication system to reflect a status of a function having two possible initial states on the receiver side of the unidirectional communication system.

The invention also relates to a wireless keyboard arrangement, and to a method of causing indicator lights on the wireless keyboard to reflect the status of a function controlled by the keyboard when the initial status of the function is unknown.

2. Description of Related Art (a) Introduction

Many computer peripherals serve primarily as input devices and therefore generally communicate with the computer in only one direction. Examples of such devices include keyboards, scanners, and joysticks or mice.

Even though most of the communications are unidirectional, however, such input devices often include status indicators or other features that require synchronization or feedback from the computer, and therefore at least intermittent bi-directional communications capabilities.

This situation occurs, for example, in the case of a keyboard having indicator lights that must reflect the status of functions toggled by keys on the keyboard, i.e., functions that switch between two states each time a key on the keyboard is pressed, but whose initial state can be arbitrarily switched so that when communications are first established, the state of the function is unknown to the keyboard and therefore cannot be reflected by the indicator. In that case, it has conventionally been considered essential to provide some way for the computer to send status signals to the keyboard, at least during initialization, that in effect synchronize the indicator to the previously unknown state of the corresponding function.

Although the invention may have broad applicability outside the context of the keyboard arrangements described in detail below, or possibly even outside the context of computer peripherals, the nature of the problem addressed by the present invention, and of its solution, are clearly demonstrated by the keyboard example. Essentially, the problem arises when the conventional wires connecting the keyboard and other peripheral are replaced by a wireless communications arrangement.

Because of the unidirectional nature of most of the communications, it is seldom cost effective to include both a transmitter and a receiver on the keyboard, and therefore the conventional wireless keyboard or peripheral input device does not include a receiver, eliminating the possibility of two-way communication with a computer.

As a result, the conventional wireless peripheral has generally been designed to eliminate any features, such as indicator lights, that require signals to be sent from the computer to the peripheral, opposite the primary direction of data flow. The present invention, on the other hand, effectively simulates the bidirectional communications of the conventional wired communications system, allowing the features such as indicator lights to be included in the wireless peripheral, even though only unidirectional communications are permitted.

(b) The Conventional Wired Keyboard

FIG. 1 illustrates an example of a conventional wired keyboard arrangement made up of a keyboard 1 connected to a computer 2 by a wire 3. As is well-known, the keyboard 1 includes certain control keys that cause keyboard-interpretation or display functions of the computer to toggle between one of two states. Each time one of these control keys is pressed, a signal is sent to the computer that causes the display function to change its state.

Examples of display functions toggled in this manner include:

(i) a "Num Lock" function, controlled by a "Num Lock" key, which causes the program in the computer that interprets signals received from keys on a numeric keypad to be toggled, or switched back and forth, between a state in which the signals are interpreted as numbers and a state in which the keys control movement of a cursor, (ii) a "Caps Lock" function, controlled by a "Caps Lock" key, which causes the program in the computer that interprets signals received from letter keys to be toggled between a state in which the signals are interpreted as small letters and a state in which the signals are interpreted as capital letters, and (iii) a "Scroll Lock" function, toggled on and off by a "Scroll Lock" key which controls scrolling or movement of text and images vertically on a monitor or display.

In order to enable the user of the keyboard to keep track of the current state of these functions, indicator lights 4–6 are included on the keyboard. Each time one of the corresponding control keys is pressed, the indicator lights are toggled on and off. In the case of the above-listed functions, illumination of the indicator lights respectively indicates that the signals from keys on the numeric keypad are being interpreted as numbers, that signals from letter keys are being interpreted and displayed as capital letters, and that the display is being prevented from scrolling text and images. The indicator lights may be placed on the keys themselves, or elsewhere on the keyboard, but in any case are positioned so that the user of the keyboard can easily refer to them by glancing down at the keyboard.

Signals originating from the keyboard are generally interpreted by the operating system or basic input/output system (BIOS) program installed in the computer, so that commands can be input through the keyboard as soon as the computer is turned on. In order to keep track of the current status of the control functions, the operating system maintains lists or files containing entries concerning the current status of the control functions. For convenience, the entries for the control functions are illustrated in FIG. 1 as being in the form of a single status table 7, although in practice different control function entries may be stored in multiple different memory areas or files on the computer. In use, each time one of the control keys is pressed, the appropriate entry on the table 7 is updated and referred to by the currently running program so that signals from the numeric keypad or letter keys will be correctly interpreted, and/or so that scroll instructions in a program implemented as desired.

In some cases, the initial setting of the control function may be set by convention. For example, it is convenient to always set the Scroll Lock function to an off state when the computer is turned on. However, in other cases, preferences as to the initial state of the function can vary, and thus the operating system may be designed to permit the initial state of the control function to be programmed. For example, the initial state of the Num Lock can be set to either of the two possible states using a command that can be included in the Autoexec batch file of a DOS or Windows™ computer. In the illustrated example, the Num Lock function is on, so that the computer will initially interpret signals from the numeric keypad as numbers rather than cursor movement commands, while signals from the letter keys are interpreted as small letters and the scroll lock function is off. Subsequent to turning on the computer, functions corresponding to the default status table entries are toggled each time a signal from one of the control keys is received, but the entries will appear as in FIG. 1 whenever the computer is turned on, until intentionally changed by, for example, editing the Autoexec batch file, irrespective of the state of the functions when the computer is turned off.

In order to indicate to the user the status of the functions in this example, it is necessary to turn the Num Lock indicator on when the computer is turned on, while leaving the Caps Lock and Scroll Lock indicators off. However, if the initial status of the Num Lock function is changed, so that when the computer is turned on again, the Num Lock function is off, then the Num Lock indicator must initially be turned off. As a result, because the status entry could have either of two possible states when the computer is turned on, and the keyboard does not initially know to which state the function has been set, the computer must initially send a signal to the keyboard over wire 3 indicating the status of the Num Lock function. In the illustrated example, upon initialization of the computer, a Num Lock ON signal will be sent to the keyboard, turning the Num Lock indicator on. Aside from the initial status of the control functions, no other signals need be sent from the computer to the keyboard.

The procedure for synchronizing indicators 4–6 with entries in the default status table 7 is summarized in FIG. 2. Whenever an initialization routine 100 is run, for example whenever the computer is turned on or reset, the computer checks the status entry for all keyboard functions that can initially be toggled (step 110) and sends a command to the keyboard (step 120) to light the appropriate LED based on the state of a corresponding entry in the keyboard function list 7 stored in the memory of the computer 2 (step 130). Thereafter, during the keyboard data input routine 140 for interpreting signals from the keyboard, whenever the keyboard function control key is pressed (step 150), a signal is sent to the computer to change the entry in the status table (160), and the corresponding indicator light is changed accordingly (step 170).

As a result, in this type of system, although the indicator light will remain in synchronism with the status table so long as the computer is running and the default table has not been intentionally changed, in order to achieve the initial synchronization, the keyboard must be capable of receiving signals from the computer that indicate the initial status of entries in the status table. The next section will describe the problem addressed by the present invention, which involves wireless -keyboards of the type illustrated in FIG. 3 rather than wired keyboards of the type illustrated in FIG. 2.

(c) The Problem—One Way Wireless Communications Systems

Although the conventional wired keyboard control arrangement has proven completely satisfactory, and is widely used, a problem arises in the case of wireless keyboards. In order to eliminate cables and enable more flexible use of the keyboard, wireless keyboard arrangements have been developed that include a receiver wired to the computer and a transmitter for sending signals representative of pressed keys to the receiver. However, as mentioned above, because the vast majority of communications between the keyboard and the computer are from the keyboard to the computer, it is generally uneconomical to include a receiver on the keyboard, and thus the conventional wireless keyboard system only permits unidirectional communication from the keyboard to the computer, eliminating the possibility of having the computer signal the initial status of entries in the status table so that the indicator will assume the appropriate ON or OFF status according to the initial state of the status table entries, and thereafter remain in synchronism with the function whenever it is toggled. Consequently, it is impossible in a conventional wireless keyboard system for the keyboard to determine how the computer is set to interpret the initial state of the keyboard function keys.

The conventional solution to this problem is demonstrated by the keyboard arrangement illustrated in FIG. 3, which includes a keyboard 8 having a transmitter 9 for communicating with a receiver 10. Receiver 10 is connected by a wire 11 to the computer 12, and includes indicator lights 13–15 that depend on initial status updates from status entries 16 stored in the computer. The reason that the indicator lights 13–15 are mounted on the receiver 10, rather than on the keyboard 8, is of course because the receiver can receive default status signals from the computer via wire 11, the keyboard control routine being exactly the same as the one illustrated in FIG. 2, with the only difference being the position of the indicator lights on the receiver rather than on the computer.

Although positioning of the indicator lights in this manner eliminates the need for a receiver on the keyboard, however, such positioning of the indicator lights away from the keyboard is often not satisfactory. For example, because most keyboard users are accustomed to the indicator lights being on the keyboard, the user will be greatly inconvenienced if the keyboard is located far from the computer, or at an angle which makes the indicator lights difficult to see, resulting in reduced typing efficiency as time is wasted re-typing incorrectly interpreted commands due to the control key having been unintentionally pressed.

(d) Generalization of the Wireless Keyboard Indicator Problem

The problem of illuminating indicator lights on a keyboard in a wireless keyboard system may be generalized, as illustrated in FIG. 4, to any one-way communications system in which toggle commands associated with an indicator or other status dependent function 40 are sent by a transmitter 41 to a receiver 42 in order to toggle a control function 43 at the receiver side whose initial status is unknown by the transmitter side, and in which the status dependent function 40 on the transmitter side must be synchronized with the receiver side function 43. While the principles of the present invention may not be applicable to all such arrangements, it is intended that the present invention be considered to cover all arrangements of the type illustrated in FIG. 4 except those to which the principles of the invention, described below, cannot be applied, to the extent that such coverage is permitted by the prior art.

Essentially, the invention is intended to apply to any one-way communications system, whether wired or not, that is intended to replace a two-way communications system of the type in which toggle commands are verified by providing an indicator or other feature responsive to confirmation signals transmitted in a direction opposite the direction allowed by the one-way communications system, in order to ensure that the indicator or other feature is synchronized with the current state of the function controlled by the toggle commands. In addition, the functions to which the invention may be applied are intended to encompass functions other than the control key functions mentioned above, so that by way of example, if the toggle commands cause a function to change from state A to state B, then the indicator must initially indicate state A and subsequently indicate state B, even in situations where the initial state of the function could be either A or B.

SUMMARY OF THE INVENTION

It is accordingly an objective the invention to provide a method of simulating two-way communications over a one-way communications system by enabling an indicator on the transmitter to reflect the manner in which signals from a function key on the transmitter side will be interpreted by an applications program on the receiver side of the communications system.

It is a further objective of the invention to provide a method of enabling a wireless keyboard that does not include a receiver to properly indicate which of two possible states a function of the computer will be in, even though the computer has no way of communicating that state to the receiver.

It is yet another objective of the invention to provide a method of causing indicator lights positioned on a wireless keyboard to confirm the on/off status of functions controlled by function keys on a wireless keyboard without knowing the default state that determines the manner in which the computer interprets the function signals, and which can be implemented in a low cost manner utilizing existing procedures and equipment wherever possible.

It is a still further objective of the invention to provide a wireless keyboard arrangement in which the on/off status various functions toggled by keys on the keyboard is indicated by lights on the keyboard even though the wireless keyboard does not include a receiver for receiving status indication signals.

Finally, it is yet another objective of the invention to provide a wireless keyboard arrangement in which the wireless keyboard includes on-board indicator lights, and which can easily be substituted for a conventional wired or wireless keyboard without the need for modifying the operating system of the computer to accommodate the modified wireless keyboard arrangement.

The objective of enabling an indicator on the transmitter side of the one way communication system to reflect the status of a function on the receiver side of the one-way communications system is achieved, in accordance with the principles of a preferred embodiment of the invention, by substituting for the status indicator signal from the receiver side a program that changes the default status on the receiver side.

In the case of a wireless keyboard, the preferred embodiment eliminates the need for sending an initial status signal, which indicates the default state of the function based on an entry in the status table, by having the wireless keyboard, upon power up, send a status signal to the computer and force the entry in the table to conform to a predetermined indicator status. As a result of this simple modification of the conventional initiation procedure, the wireless keyboard and the computer are synchronized without the need for sending a status signal from the computer to the keyboard.

In an especially preferred embodiment of the invention, the function of comparing the initial status of the indicator with an default status entry and commanding a change in the default status entry is carried out by a simple circuit included in the receiver, or by corresponding software in the receiver, so that the computer does not need to be programmed to carry out the initial comparison and command functions, enabling the preferred wireless keyboard arranged to more easily be substituted for a conventional wired or wireless keyboard arrangement.

DETAILED DESCRIPTION OF THE PREFERRED EMBODIMENTS

Figure 5:
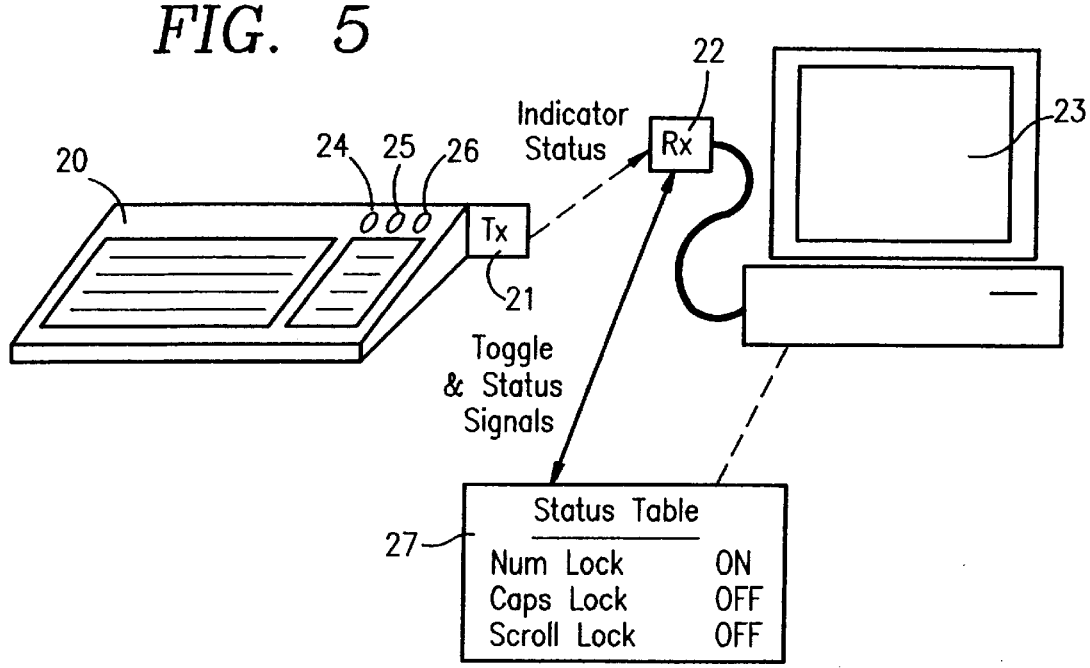
FIG. 5 is a schematic view of a one-way wireless communications system constructed according to the principles of a preferred embodiment of the invention, and in particular of a wire keyboard arrangement having indicator lights on the keyboard.

FIG. 5 illustrates a wireless keyboard arrangement constructed in accordance with the principles of a preferred embodiment of the invention. The keyboard arrangement of FIG. 5 includes a keyboard 20 having a transmitter 21 arranged to transmit infrared or radio frequency signals to a receiver connected to or located in a computer 22. Those skilled in the art will appreciate that computer 22 may be a personal computer, a notebook computer, or any other computing device or electronic appliance capable of receiving and interpreting signals from the keyboard.

Figure 1:
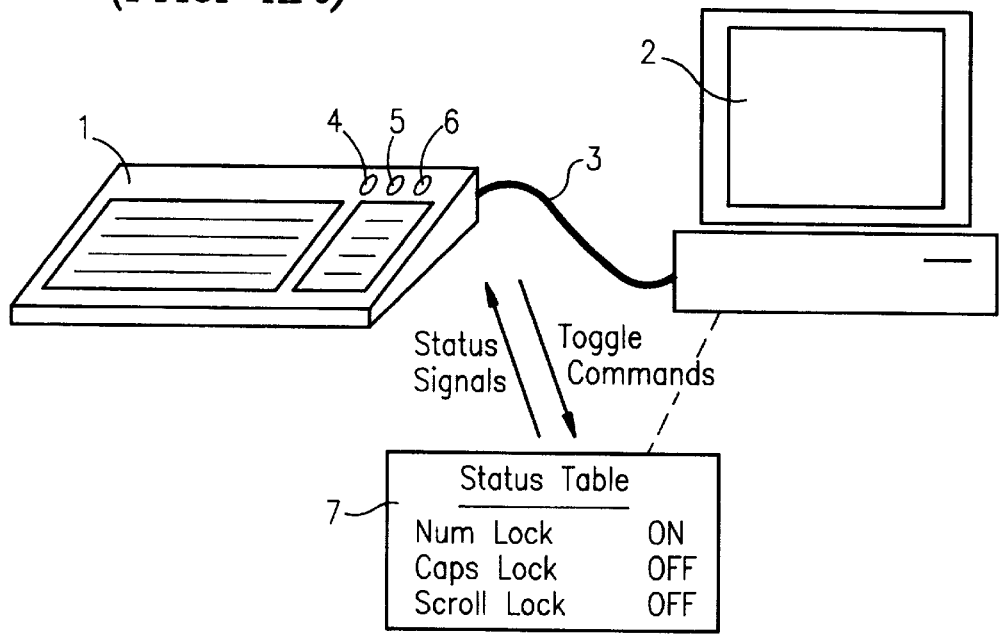
FIG. 1 is a schematic view of a conventional wired keyboard system.
Figure 3:
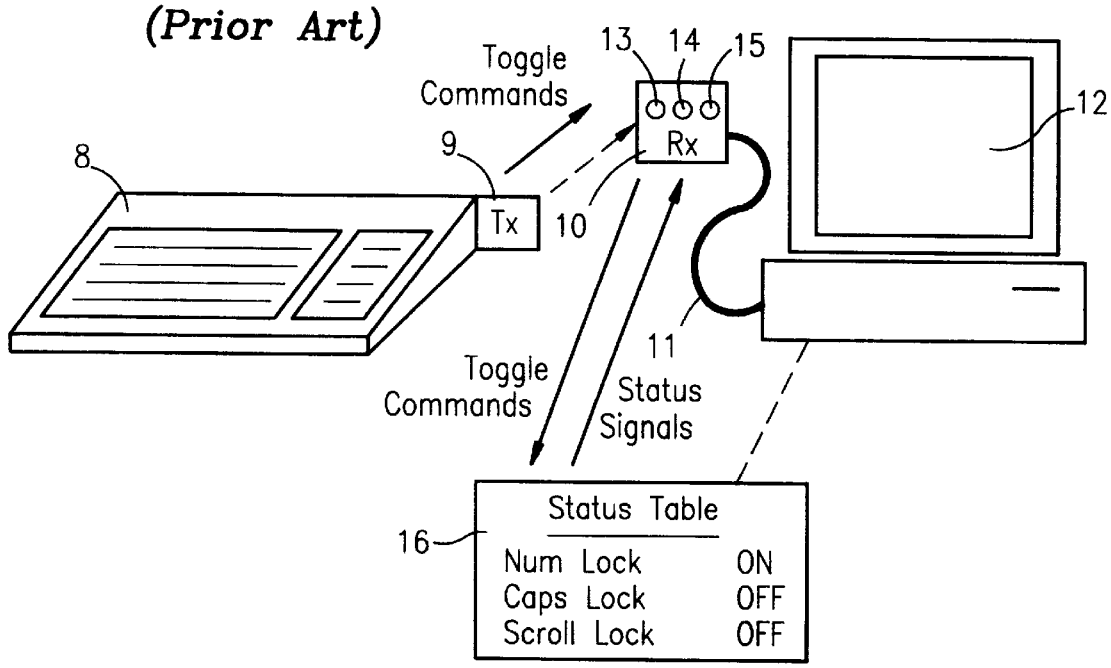
FIG. 3 is a schematic view of a conventional wireless keyboard system, which only permits one-way communications.

While the transmitter 21 and receiver 22 are generally identical in structure and function to the transmitter 9 and receiver 10 of the conventional wireless keyboard arrangement illustrated in FIG. 3, and the keyboard 20 may be otherwise arranged in the same manner as conventional wireless keyboard 8, unlike keyboard 8, wireless keyboard 20 includes indicator lights 24–26 corresponding in function to indicator lights 4–5 of the conventional wired keyboard. In particular, by way of example, wireless keyboard 20 may include, but is not limited to, a Num Lock indicator 24, a Caps Lock indicator 25, and a Scroll Lock indicator 26 having the functions described above in connection with FIG. 1.

Indicators may be wired to the corresponding function keys in the same manner as in the conventional keyboard, but instead of initially setting the flip flop or similar bistable multivibrator circuit by means of a default status input signal from the computer and triggering a change in the output state of circuit when a corresponding control key is pressed as in the conventional keyboard, the indicator lights of the preferred embodiment have a preset initial state.

Figure 7A:
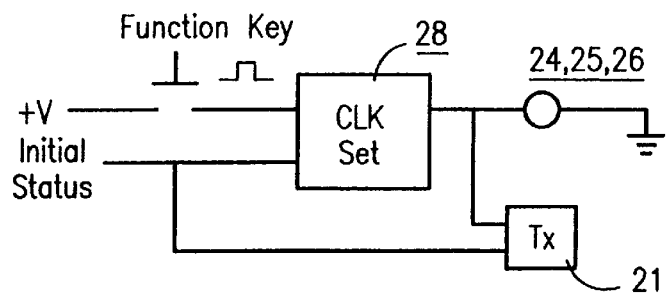
FIG. 7A is a schematic diagram of a possible circuit arrangement for the indicator lights included on the keyboard of FIG. 5.

As illustrated in FIG. 7A, the preset initial state of the indicator lights can, by way of example, easily be implemented by connecting the "set" input of a flip flop 28 to a constant or reference voltage source, or to a voltage source that can be adjusted by a switch on the keyboard itself to set the preferred initial state, referred to in FIG. 7A as the initial status input, the output of the flip flop 28 being connected to the indicator light and toggled ON and OFF each time the corresponding function key is pressed, and the initial status input being further supplied to the transmitter circuit 21 for inclusion in an indicator status signal portion of the initialization packet. This implementation has the advantage of requiring minimal modification of the conventional arrangement, although numerous other arrangements by which the indicator is switched on and of f and the status of the indicator determined are also possible, and the invention is not intended to be limited to any specific circuitry for accomplishing these functions.

The transmitter circuit 21 simply adds one bit for each indicator to the communications packet or signal by which it transmits initialization or synchronization information to the computer, the one bit indicating the initial state of the indicator. This bit is then used by the operating system or other program on the computer to set the default status table so that the initial state of the indicator is the same as the entry for the corresponding function in the default status table 27. Thereafter, the computer may respond to toggle commands from the keyboard in exactly the same manner as it responds to commands from the keyboards illustrated in FIGS. 1 and 3.

Figure 7B:
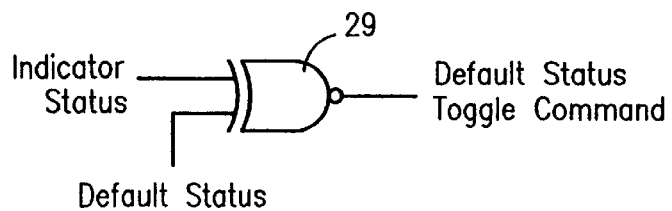
FIG. 7B is a schematic diagram of a possible circuit arrangement for the receiver in the system of FIG. 5.

Upon receipt of a signal containing the indicator light status signal, the computer must determine whether the default table status is the same as the indicator light status. While this could be accomplished by the operating software, it is more practical to build the comparison capability into the receiver 22, in order to avoid having to modify the computer in order to use the preferred wireless keyboard. In the example illustrated in FIG. 7B, the receiver circuitry includes a comparison circuit 29 having as inputs the indicator status signal transmitted by the wireless keyboard 20, and a default status signal received from the computer 23. Since conventional computers are already programmed to send a default status signal, as described above, no modification of the basic computer operating system is necessary. The output of circuit 29 illustrated in FIG. 7B is a signal that indicates whether there is a difference between the indicator status signal and the default status signal, the output being supplied to the computer to toggle the appropriate entry in the default status table 27 whenever a difference is detected.

Figure 6:
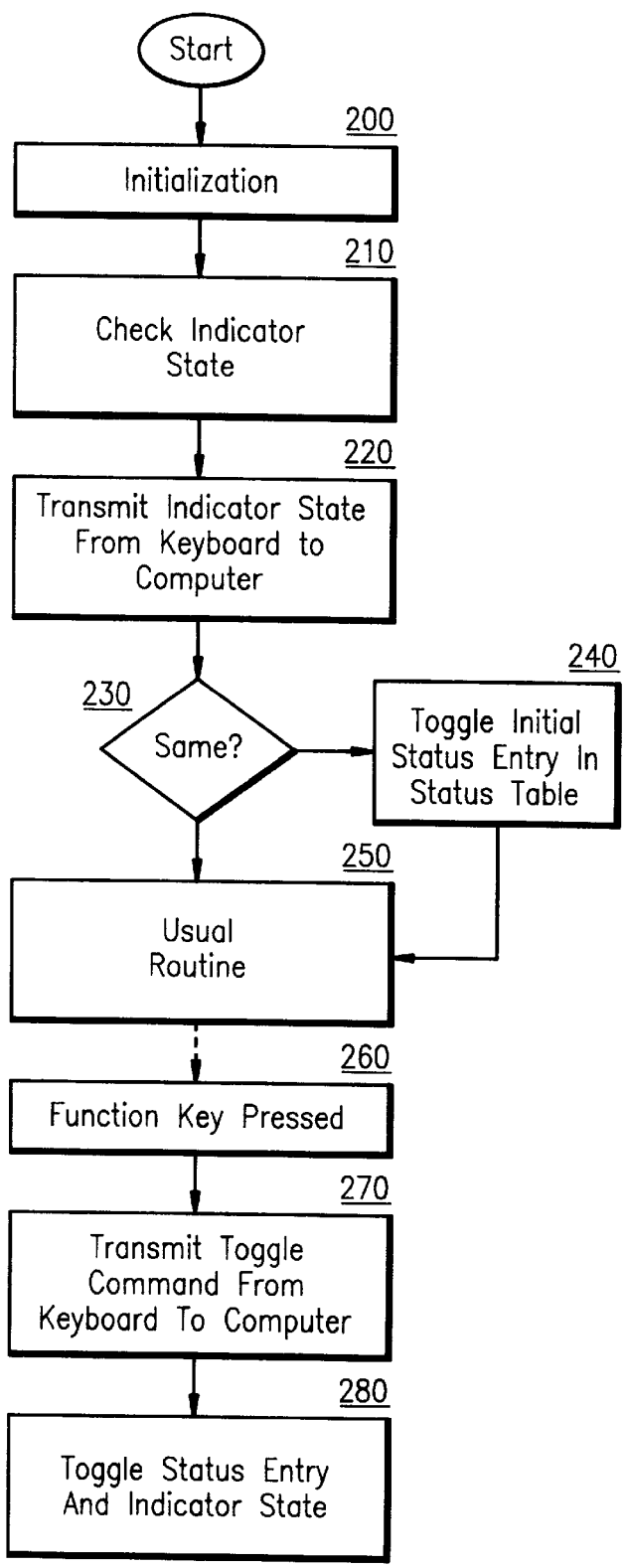
FIG. 6 is a flowchart of a method of simulating bi-directional communications in the one-way communications system of FIG. 5.
Figure 4:
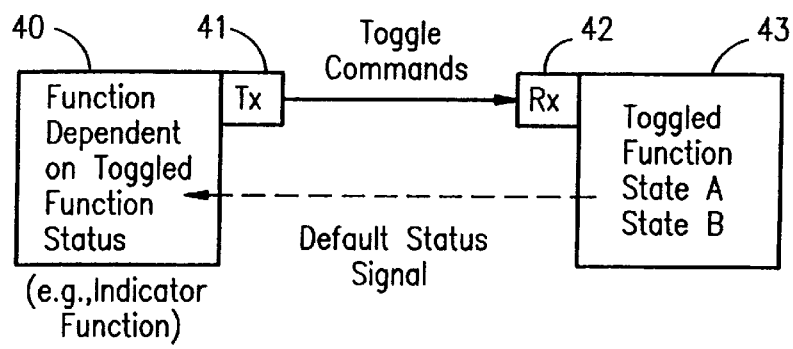
FIG. 4 is a schematic view of a more general unidirectional communications system to which the principles of the invention may be applied.

The preferred method of synchronizing indicator lights 24–26 with entries in default status table 27 is illustrated in FIG. 6. In contrast to the conventional bi-directional keyboard communications protocol, in which the computer operating system first checks the default status of any functions that are controlled by function keys on the keyboard and then transmits a default status to the keyboard, the initialization routine 200 for the unidirectional communications protocol of the preferred method begins in step 210 by checking the status of indicators located on the wireless keyboard. Step 210 may correspond to the operation of the circuit illustrated in FIG. 7A.

Those skilled in the art will appreciate that a wireless keyboard must inherently include its own power source or a separate connection to a power source, and that when the keyboard is turned-on, it must be able to initiate communications without prompting from the computer. Step 220 is preferably carried out as part of this normal routine by including the indicator status signal in the communications packet or signal. Upon receipt of the status signal by the receiver, the status signal is compared in step 230 to the default entry in the status table, for example by using the circuit illustrated in FIG. 7B.

Since the need for synchronization only occurs for functions having a default status that can be varied by the user, the computer is already arranged to set the default status, and the same program steps used in the conventional system to set the default status based on user input can instead be used in step 240 to set the default status entry based on the results of the comparison step 230. If the status of an indicator light does not match the corresponding default status table entry, the receiver commands the personal computer to force the computer to change the default status to the actual indicator light status received from the wireless keyboard. As a result, the on/off state of any indicator lights on the wireless keyboard will always be synchronized to the current status of the function carried out by the computer and it is not necessary for the computer to signal back to the keyboard the status of those functions. On the other hand, since the computer must send a status signal to the receiver in order to enable the comparison step 230, operation of the wireless keyboard is essentially transparent to the computer, so that the wireless keyboard can easily be substituted for a conventional wired keyboard.

Figure 2:
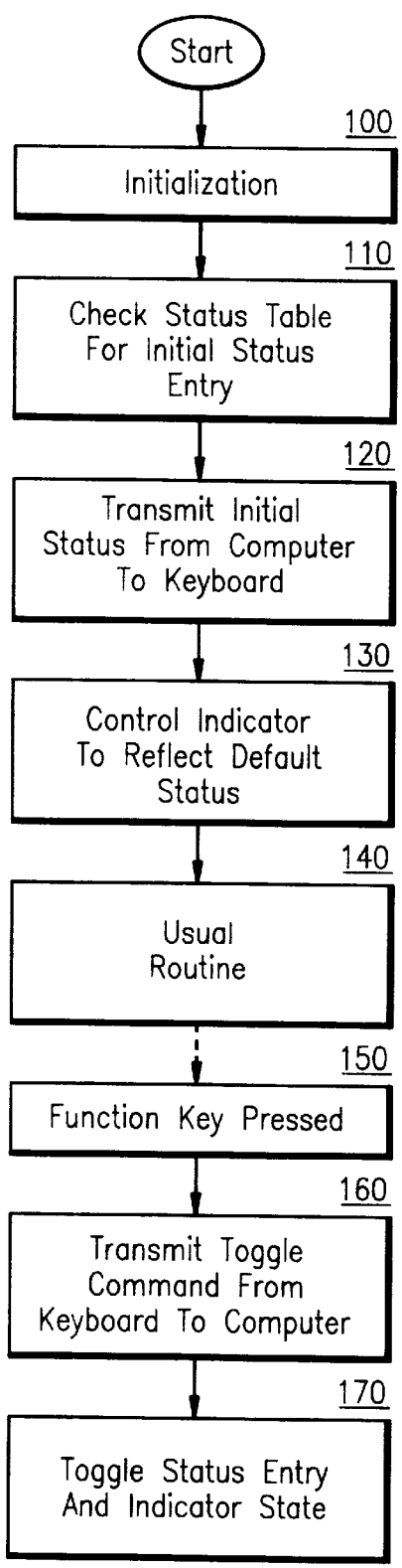
FIG. 2 is a flowchart of a conventional method of initializing an indicator light in the wired keyboard system of FIG. 1.

Once the status entry in the default status table is set to the initial indicator status, the keyboard communications program can be carried out using the same routine 250 as in the conventional arrangement illustrated in FIG. 2. Each time the function key is pressed (step 260), the toggle command is transmitted from the keyboard to the computer (step 270), and the status entry and indicator are toggled accordingly (step 280). As in the conventional arrangement, these steps can be carried out by software or appropriately designed hardware, including the hardware schematically shown in FIGS. 7A and 7B.

Those skilled in the art will appreciate that the principles of the embodiment described above may be extended to arrangements other than wireless keyboard arrangements. In general, the method of the invention can be applied to any one-way communication system in which an indicator on the transmitter side of the system is required to reflect the status of a function on the receiver side of the system, by toggling the function to reflect the status of the indicator rather than causing the indicator to reflect the initial status of the function.

Having thus described various preferred embodiments of the invention, those skilled in the art will appreciate that variations and modifications of the preferred embodiment may be made without departing from the scope of the invention. It is accordingly intended that the invention not be limited by the above description or accompanying drawings, but that it be defined solely in accordance with the appended claims.

I claim:

1. A method of causing an indicator light on a transmitter side of a one-way communication system between a transmitter and a receiver to reflect a status of a function on a receiver side of the one-way communication system, said indicator light having a current status which changes each time said function is toggled by commands from the transmitter side, comprising the steps of:

(a) transmitting an initial status of the indicator light to the receiver; and (b) if an initial status of said indicator light does not match a default entry in a list of default statuses for functions toggled by commands from the transmitter side, said list of default statuses being on the receiver side of the one-way communication system, changing said default entry to reflect the initial status of the indicator light on the transmitter side of the one-way communications system, whereby the initial status of said indicator light is thereby caused to correctly indicate a default status of said function even when said default entry in the list of default statuses does not initially correspond to the initial status of said indicator light.

2. A method as claimed in claim 1, wherein the transmitter is a transmitter of a wireless keyboard, the indicator light is situated on the wireless keyboard, and the receiver is connected to a computer, and wherein step (a) comprises the step of sending a current status of the indicator light to the computer, and step (b) comprises the steps of comparing the current status of the indicator light with an entry on the status list and changing the entry on the default status list to reflect the state of the indicator light.

3. A method as claimed in claim 2, wherein the function is selected from the group consisting of a Num Lock function, a Caps Lock function, and a Scroll Lock function.

4. A method as claimed in claim 2, wherein the step of comparing the indicator light status with the entry on the default status list is carried out by the receiver upon receipt from the keyboard of the indicator light status signal and upon receipt from the computer of a signal indicating the entry on the default status list, and wherein the step of changing the entry on the default status list is carried out by sending a signal reflecting a result of the comparison from the receiver to the computer when a difference between the indicator light status and the default status list entry is detected.

5. A method as claimed in claim 1, further comprising the step of toggling the state of the indicator light each time a corresponding function command is transmitted by the keyboard.

6. A method as claimed in claim 1, wherein the one-way communication system is a wireless one-way communication system.

7. A method as claimed in claim 1, wherein the receiver is connected to a computer and wherein the transmitter is connected to a computer peripheral.

8. A wireless keyboard arrangement, comprising:

a wireless keyboard having a transmitter and an indicator light and means for transmitting a state of said indicator light;

a receiver connected to a computer;

means in the receiver for receiving a command from the wireless keyboard to toggle a function;

means in the keyboard for causing said indicator light to toggle in response to pressing a key on said keyboard;

means in the computer for storing a list of default states of the function; and means in the receiver for comparing said list of default states of the function with said state of said indicator light, and for commanding the computer to set an entry in the list of default states to correspond to the state of the indicator light, thereby synchronizing the indicator light with the entry, whereby an initial state of said indicator light is thereby caused to correctly indicate a default state of said function even when said entry in the list of default states does not initially correspond to the state of said indicator light.

9. Apparatus for causing a feature on a transmitter side of a one-way communication system between a transmitter and a receiver to reflect a status of a function on a receiver side of the one-way communication system, wherein:

the transmitter is arranged to transmit a status of the feature to the receiver; and the receiver is arranged to generate a command for changing an entry in a list of default statuses for functions toggled by commands from the transmitter side, said list of default statuses being on the receiver side of the one-way communication system, to reflect the status of the feature on the transmitter side of the one-way communications system, wherein the transmitter is a transmitter of a wireless keyboard, the feature is a light on the wireless keyboard, and the receiver is connected to a computer, and wherein the transmitter is arranged to transmit a current status of the indicator light to the computer and the receiver is arranged to compare the current status of the indicator light with an entry on the status list and to command a change in the entry on the default status list to reflect the state of the indicator light.

10. Apparatus as claimed in claim 9, wherein the feature is an function status indicator.

11. Apparatus as claimed in claim 10, wherein the transmitter is a transmitter of a wireless keyboard, the indicator is a light on the wireless keyboard, and the receiver is connected to a computer, and wherein the transmitter is arranged a current status of the indicator light to the computer and the receiver is arranged to compare the current status of the indicator light with an entry on the status list and to command a change in the entry on the default status list to reflect the state of the indicator light.

12. Apparatus as claimed in claim 11, wherein the function is selected from the group consisting of a Num Lock function, a Caps Lock function, and a Scroll Lock function.

13. Apparatus as claimed in claim 11, wherein the receiver is arranged to compare the indicator light status with the entry on the default status list upon receipt from the keyboard of the indicator light status signal and upon receipt from the computer of a signal indicating the entry on the default status list, the receiver being arranged to thereupon send a signal reflecting a result of the comparison to the computer when a difference between the indicator light status and the default status list entry is detected.

14. Apparatus as claimed in claim 9, wherein the one-way communication system is a wireless one-way communication system.

15. Apparatus as claimed in claim 9, wherein the receiver is connected to a computer and wherein the transmitter is connected to a computer peripheral.

* * * * *